United States Patent Office 3,007,898
Patented Nov. 7, 1961

3,007,898
TEREPHTHALATE/PINATE INTERPOLYESTERS
Marion R. Lytton, West Chester, and Edward A. Wielicki, Philadelphia, Pa., assignors to American Viscose Corporation, Philadelphia, Pa., a corporation of Delaware
No Drawing. Filed May 6, 1958, Ser. No. 733,450
6 Claims. (Cl. 260—75)

This invention relates to new and useful interpolyesters, shaped articles prepared therefrom and methods of preparing the same. More particularly it is directed to unique interpolyesters of terephthalic acid, a glycol and an alicyclic dicarboxylic acid. This invention relates further to films, fibers, molded products, coatings and other shaped articles prepared from the unique interpolyesters described above.

The history of polyesters is a relatively short but active one. Condensation polyesters, while encountered in early researches such as those of Lourenco, Bischoff, Fischer, etc., were not intensively studied until 1928, when Carothers and co-workers began a systematic study of condensation polymerization. Illustrative of Carothers' work is U.S. Patent No. 2,071,250 (1937) which discusses some of the previous work in the field and some of the problems in drawing polyesters into fibers. Carothers produced filaments from his polyesters, but they were low-melting and lacked hydrolytic stability.

The current prior art describes various linear condensation polyesters derived from dihydroxy compounds and dibasic acids, such as terephthalic acid, which are capable of being drawn into fibers showing, by characteristic X-ray patterns, orientation along the fiber axis. However, in using a single glycol and single acid to prepare a polyester, one is limited to a fixed crystal structure and melting point since the constitution of the polymer cannot be varied.

This invention overcomes these limitations in providing as one of its objects new and useful highly polymeric interpolyesters of terephthalic acid and either pinic acid, norpinic acid or homopinic acid having valuable properties, including those of being capable of being formed into useful filaments, films, and the like. It is a further object of this invention to provide unique interpolyesters as described above which possess melting points and rates of crystallization which make them amenable to the preparation of new and useful fibers, films, molded products, coatings, other shaped articles and the like. A still further object is the provision of unique interpolyesters having a low degree of solubility in organic solvents. A further object is the provision of new and useful synthetic filaments and films possessing improved moisture regain characteristics. Another object is the provision of new and useful synthetic fibers, film and molded objects having improved dyeing characteristics. A still further object is the provision of a new process for making the unique interpolyesters of this invention. Other objects will appear hereinafter.

The synthetic products according to the present invention are difficultly soluble, usually crystallizable, orientable, highly polymerized interpolyesters of terephthalic acid, an acid having the general formula:

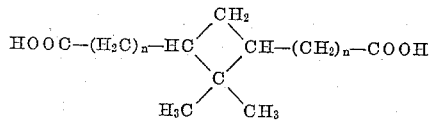

wherein $n$ is an integer from 0 to 1, viz. pinic acid, norpinic acid, or homopinic acid, and a glycol or dihydric alcohol selected from the group consisting of one having the general formula:

(A)         HO—R—OH wherein R is a bivalent straight or branched chain aliphatic hydrocarbon radical containing 2 to 20 carbon atoms, or (B)         HO—(R'X)$_n$—R'OH wherein R' is a bivalent straight or branched chain aliphatic hydrocarbon radical containing 2 to 10 carbon atoms, X is an ether oxygen or sulfone group and $n$ is an integer from 1 to 6, or (C)         HO—(CH$_2$)$_m$—Ar—(CH$_2$)$_m$—OH wherein Ar is a mono- or di-nuclear aromatic hydrocarbon radical containing 6 to 12 nuclear carbon atoms and $m$ is an integer from 1 to 4, or (D) HO—(R'X)$_n$—(CH$_2$)$_p$—Ar
                     —(CH$_2$)$_p$—(XR')$_n$—OH wherein R', X and $n$ are the same as in (B), Ar is the same as in (C), and $p$ is an integer from 0 to 4, or (E)         HO(CH$_2$)$_p$—R''—(CH$_2$)$_p$—OH wherein R'' is an alicyclic hydrocarbon radical containing 4 to 6 carbon atoms and $p$ is the same as in (D), or (F) HO—(R'X)$_n$—(CH$_2$)$_p$—R''
                     —(CH$_2$)$_p$—(XR')$_n$—OH wherein R', X and $n$ are the same as in (B), $p$ is the same as in (D), and R'' is the same as in (E).

The polyesters of the present invention possess, among others, the following superior fiber and film properties: (1) controlled melting points over a relatively wide range, i.e. above 140° C., (2) toughness, (3) controlled crystallizability dependent upon thermal and orienting treatment, (4) orientability, (5) pliability and (6) lack of color. Items (1) and (3) are important in order that the fiber or film have good thermal and dimensional stability, as well as orientability, under a variety of conditions. The advantages of toughness, pliability and lack of color are readily apparent. In order that these latter characteristics be attained, the fiber or film forming polymer must not crystallize too rapidly; otherwise it will not be possible to properly orient it. In other words, it must be capable of being easily converted to an amorphous form which can be oriented by cold or hot drawing or other known orienting procedures. On the other hand, the fiber or film-forming polymer must have latent ability to crystallize, for if it does not it is then brittle toward impact and possesses poor dimensional stability.

In preparing the unique interpolyesters of this invention, terephthalic acid, or a diester or acid chloride thereof, is reacted together with the alicyclic dicarboxylic acid described above, or a diester or acid chloride thereof, and one of glycols described above. An ester interchange reaction is generally preferred since the time required to form the interpolyesters of this invention is generally considerably less, and/or side reactions can generally be minimized to a greater degree than when the free dicarboxylic acids are employed.

The ester interchange method for preparing the interpolyesters of this invention proceeds in three stages:

(I) One mole of a mixture of a diester of terephthalic acid and a diester of one of the pinic acids described above is reacted in the presence of heat and an ester interchange catalyst with at least two moles of a glycol and a monohydric alcohol is distilled off;
(II) The temperature is gradually raised to bring about polymerization and excess glycol is distilled off; and
(III) Polymerization is driven to completion by gradually reducing the pressure to remove the last traces of glycol.

The overall process is illustrated by the following equations:

(I)

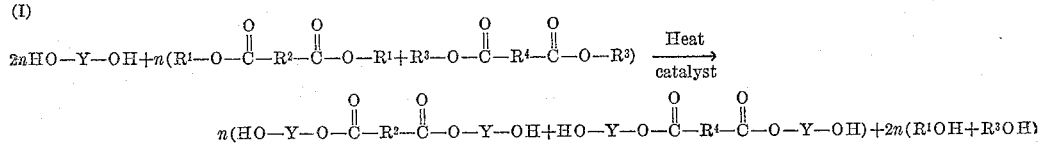

(II and III)

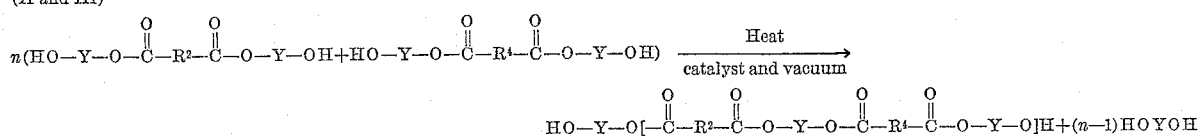

wherein Y is a bivalent hydrocarbon or hetero hydrocarbon radical as described in (A) through (F) above; $R^1$ and $R^3$ are same or different hydrocarbon radicals derived from a straight or branched chain aliphatic primary or secondary monohydric alcohol boiling within the range from about 64° to 215° C.; $R^2$ is hydrocarbon residue of terephthalic acid and $R^4$ is the hydrocarbon residue of one of the pinic acids described above.

In a preferred embodiment of this invention, the mixture of monomeric diesters described above (in a ratio of 50 to 90 mole percent of a terephthalate and 50 to 10 mole percent of a pinate) and a glycol are weighed into a vessel, the ester interchange catalyst added, and a boiling chip introduced. Stage I ester interchange is then carried out at atmospheric pressure under nitrogen at a temperature between about 150° and 225° C. (preferably 175° to 200° C.) for about 2 to 10 hours, distilling off monohydric alcohol. Polymerization is then brought about in stage (II) by raising the temperature gradually to between about 200° and 400° C. (preferably about 260° to 290° C.) over a period of about ½ to 2 hours, continuing polymerization for a period of about ½ to 3 hours at this temperature and distilling off excess glycol. In stage (III) pressure is gradually reduced to below about 5 mm. (preferably 0.2 to 0.5) over a period of about ½ to 4 hours (preferably about 1 to 2 hours), followed by continued heating at this elevated temperature and reduced pressure for a period of about 2 to 10 hours. In this latter step the last traces of the glycol are distilled off and the reaction mixture becomes progressively more viscous.

The specific temperatures and heating periods may vary over wider ranges than those outlined above depending on the observed rate of reaction. In cases where reaction becomes sluggish, higher temperature and/or longer periods of time will be employed. In those cases where the polymer is solidified, or begins to solidify before it is apparent all glycol has been removed, the temperature and/or the heating period are increased. The conditions can be varied considerably depending upon the degree of the polyesterification desired, the ultimate properties sought, stability of the polyester being produced and use for which the product is intended. When the desired viscosity is reached under these conditions in stage (III), evacuation and heating are discontinued, an inert gas admitted, the vessel allowed to cool to approximately room temperature and the polyester removed.

In theory a total of only one mole of the glycol is necessary to effect complete polyesterification with one mole of the mixed diesters of terephthalic and one of the pinic acids. However, in practice, it is difficult to attain complete reaction under these conditions. It is therefore usually necessary to utilize an excess of the glycol, preferably at least two moles of glycol to one mole of mixed diesters. Quantities, substantially larger than about 2 moles of the glycol may be used; however, since they are not necessary, in the interests of economy, they are not recommended.

Examples of some of the various monomeric diesters which can be employed in accordance with the process of the invention include those derived from terephthalic acid, the alicyclic acids of this invention and one of the following primary monohydric alcohols: methanol, ethanol, propanol-1, 2-methyl-propanol-1, butanol-1, 2-methyl-butanol-4, 2,2-dimethyl propanol-1, pentanol-1, 2-methyl-pentanol-1, 2-methyl-pentanol-5, 3-methylolpentane, hexanol-1, 2-methyl-hexanol-1, 2-methyl-hexanol-6, heptanol-1, 2-ethyl-hexanol-1, octanol-1, nonanol-1, 2,6-dimethyl-3-methylol heptane. Diesters derived from these same acids and secondary monohydric alcohols can be utilized also, e.g. propanol-2, 2-methyl-butanol-3, pentanol-2, pentanol-3, 2-methyl-pentanol-3, 3-methyl-pentanol-2, hexanol-2, 2,2-dimethyl-butanol-3, 2-methyl-hexanol-3, heptanol-4, octanol-2, decanol-4.

Since in the preferred process, the alcohols from which the diesters are derived are removed from the reaction zone by boiling, it is generally necessary to utilize a glycol having a boiling point higher than that of the alcohol being evolved. Examples of some of the glycols described in (A) through (F) above are as follows:

(A) Ethylene, trimethylene, tetramethylene, pentamethylene, hexamethylene, decamethylene glycols, 2,2-dimethyl-1,3-propane diol, 2,2,3,3-tetramethyl-1, 4-butanediol, 2-buten-1,4-diol, 2-hexen-1,6-diol, 3-octen-1, 8-diol, 2,2,5,5-tetramethyl-3-hexene-1,6-diol, etc.;

(B) Diethylene glycol, triethylene glycol, tetraethylene glycol, dipropylene glycol, 4,4'-dihydroxy dibutyl ether, other polyoxyalkylene glycols having 1 to 6 oxyalkylene units wherein said oxyalkylene unit contains 1 to 10 carbon atoms, 2,2'-sulfonyl diethanol, 4,4'-sulfonyl dibutanol, 3,3'-[sulfonyl bis-(3 propyl sulfonyl)] dipropanol, 4,4'-[1,4-butylene disulfonyl-bis-(4-butyl sulfonyl)] dibutanol, sulfonyl-bis-(4-butyl sulfonyl-4-butyl sulfonyl-4-butanol) 6,6'-(1,6-hexylene disulfonyl) dihexanol, sulfonyl-bis-[3-(2,2-dimethyl) propanol], 1,3-(2,2-dimethyl) propylene disulfonyl-bis-[3-(2,2-dimethyl)-propyl-sulfonyl-3-(2,2 - dimethyl) propanol], sulfonyl-bis-[4-(2,2,3,3-tetramethyl) butanol], etc.;

(C) p-Xylylene glycol, 3,6-bis-(hydroxymethyl) durene, 4,4'-bis-(hydroxymethyl) biphenyl, 2,6-bis-(hydroxymethyl) naphthalene, 1,5-bis-(γ-hydroxypropyl) naphthalene, 1,4-bis-(β-hydroxyethyl) benzene, 1,4-bis-(γ-hydroxypropyl) benzene, 3,6-bis-(β - hydroxyethyl) durene, etc.;

(D) 2,2'-(p-phenylene-dioxy) diethanol, 3,3'-(p-xylylene-dioxy) dipropanol, 4,4'-(p-phenylene-disulfonyl) dibutanol, 6,6'-(p-xylylene-disulfonyl) dihexanol, 2,2'-(4,4'-biphenylene-dioxy) diethanol, (1,5-naphthalene-disulfonyl) dimethanol, 2,2'-[p-phenylene-dioxy-bis-(2-ethoxy-2-ethoxy)]-diethanol, 2,2'-[p-phenylene - disulfonyl-bis-(2-ethyl-sulfonyl)] diethanol, etc.;

(E) 2,2'-(p-cyclohexylene) diethanol, 4,4'-(p-cyclohexylene) dibutanol, the dihydric alcohol produced by oxidation of α pinene having the formula:

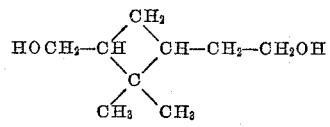

etc.;

(F) 2,2'-(p-cyclohexylene dioxy) diethanol, 2,2'-(p-cyclohexylene disulfonyl) diethanol, 2,2'-(p-cyclohexylene-diethoxy-) diethanol, p-cyclohexylene-bis-(3-propoxy-3-propoxy-3-propanol),

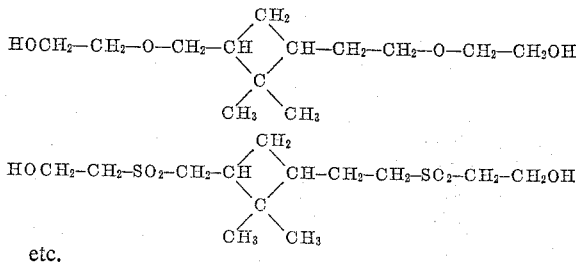

etc.

The catalytic condensing agents or ester-interchange catalysts which may be employed are conventional ones and include, for example, the alkali metals, the alkaline earth metals; the oxides, carbonates, and borates of these two groups of metals; the one to six carbon alkoxides of these two groups of metals; magnesium, zinc, and manganese; the oxides of these metals; zinc borate; the sulfates, phosphates and acetates of zinc, cadmium, magnesium, aluminum and copper; litharge or a combination of litharge with antimony trioxide and triphenyl phosphite as described in U.S. Patent No. 2,650,213; compounds of the formula:

$$M(Al(OR)_4)$$

wherein M is an alkali metal, e.g. lithium, sodium or potassium, and R is an alkyl radical containing from 1 to 6 carbon atoms; R can be derived from a lower aliphatic alcohol such as methyl, ethyl, propyl, n-butyl, isobutyl, n-amyl, etc., as described in U.S. 2,720,506; a composition consisting of lithium hydride and a glycol-soluble organic salt of cadmium, magnesium, or zinc as described in U.S. Patent No. 2,681,360.

From about 0.005% to about 0.2% of such catalysts based on the weight of diester monomer being condensed may be employed. Higher or lower percentages may also be employed. Generally, from about 0.01% to about 0.05% of the catalytic condensing agent can be advantageously employed, base on the weight of dibasic acid diester being condensed. As will be apparent to those skilled in the art, it is generally advantageous from a cost standpoint to utilize the minimum quantity of one of the above catalysts which effect optimum results. Obviously, however, quantities larger or smaller than those outlined above will be employed by those skilled in the art where needed, e.g. to accelerate or decelerate rate of reaction, to modify properties—luster, molecular weight, tenacity, etc.

The reaction can be carried out in the presence or absence of a solvent, preferably the latter. Illustrative of such solvents are inert high boiling compounds, such as diphenyl ether, diphenyl, mixed tolyl sulfones, chlorinated naphthalene, chlorinated diphenyl, dimethyl sulfolane, etc.

It is essential to exclude oxygen and moisture at all stages of the condensation reaction. Otherwise discoloration, low molecular weight, and/or insolubilization of the polyester results. Inert atmospheres which can advantageously be employed include nitrogen, hydrogen, helium, etc. The exclusion of moisture is readily effected by employing substantially anhydrous reactants.

In the following examples which illustrate a preferred embodiment of the present invention, approximately 1.0 mol of the mixture of monomer esters and 2.2 mols of ethylene glycol were weighed into the reaction vessel, catalyst added, and a small quartz boiling chip was introduced. Ester interchange was brought about at atmospheric pressure under nitrogen at a temperature of about 180° C. for about 6 hours resulting in the distillation of methanol and ethanol. The temperature was then raised to about 275° C. over a period of about 1 hr. and the heating continued at this temperature and atmospheric pressure for about 30 minutes resulting in the distillation of the major part of the excess ethylene glycol. The pressure was then reduced to about 0.2 mm. of mercury over a period of about 1½ hours with continued heating. Heating was continued at this elevated temperature and reduced pressure for about 5 hours resulting in the distillation of the remaining ethylene glycol. In this stage the reaction mixture became progressively more viscous. At the end of this stage, evacuation and heating were discontinued, nitrogen was admitted to the reaction vessel, the polymer allowed to cool and then removed from the reaction vessel.

The following examples are not given by way of limitation, the scope of the invention being determined by the appended claims.

*Copolyesters of dimethyl terephthalate and diethyl pinate with ethylene glycol*

| Example | 1 | 2 | 3 | 4 | 5 |
|---|---|---|---|---|---|
| Mole Percent DMT [1] | 90 | 80 | 70 | 60 | 50. |
| Mole Percent DEP [2] | 10 | 20 | 30 | 40 | 50. |
| Grams DMT (Moles) | 13.98 (.072) | 12.43 (.064) | 10.87 (.056) | 9.32 (.048) | 7.77 (.040). |
| Grams DEP (Moles) | 1.94 (.008) | 3.88 (.016) | 5.82 (.024) | 7.75 (.032) | 9.69 (.040). |
| Grams EG (Moles) | 10.92 (.176) | 10.92 (.176) | 10.92 (.176) | 10.92 (.176) | 10.92 (.176). |
| Catalyst | 50–50 wt. percent ZnAc-MnAc.[3] | 50–50 wt. percent ZnAc-MnAc. | 50–50 wt. percent ZnAc-MnAc. | 50–50 wt. percent ZnAc-MnAc. | 50–50 wt. percent ZnAc-MnAc. |
| Grams Catalyst | .02 | .02 | .02 | .02 | 0.2. |
| Appearance of Bulk Polymer | Buff colored opaque solid. | Amber colored glass; became opaque on annealing at 110°. | Amber colored glass; became opaque on annealing at 110°. | Amber colored glass; became translucent on annealing at 110°. | Amber colored glass. No crystallization on annealing at 110°. |
| Crystalline, M.P. | 228° C | 198° C | 167° C | 154° C | |
| Intrinsic Viscosity [4] | .55 | .51 | .52 | .49 | .43. |
| Filament Formation and Properties of Filaments. | Formed long filaments which showed cold drawing. | Formed long filaments which showed some cold-drawing. | Formed long filaments which showed some cold-drawing. | Formed long filaments which whowed cold-cold-drawing. | |
| Film Formation and Properties of Quenched Films. | Quenched films were transparent and flexible. | Quenched films were transparent and flexible. | Quenched films were transparent and flexible. | Quenched films were transparent and flexible, but somewhat weak. | |

[1] Dimethyl terephthalate.
[2] Diethyl pinate.
[3] Zn acetate—manganese Acetate.
[4] In 60–40 wt. percent tetrachlorethanephenol at 25° C.

The interpolyesters of this invention can be formed into filaments or films by conventional melt extrusion procedures. For example, the interpolyesters can be melt extruded vertically at a melt temperature of approximately 25° C. above the melting point of the interpolyester followed by immediate quenching and orientating.

Although illustrated in the preferred embodiment as a batch process, the interpolyesters of this invention can be produced by continuous methods also; for example, the required amounts of the several reactants and catalyst can be continuously metered into the reaction vessel, maintained therein for the required reaction time under the required reaction conditions of temperature and pressure and then continuously drawn off.

We claim:

1. A filament and film forming interpolyester of a mixture of acids and at least 2 mols per mol of mixed acids of a glycol having the formula HO—R—OH, wherein R is an alkylene radical having from 2 to 20 carbon atoms, said acids consisting essentially of from 50 to 90 mol percent of terephthalic acid and from 50 to 10 mol percent of a dicarboxylic acid having the following general formula:

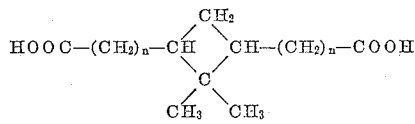

wherein $n$ is an integer from 0 to 1, said interpolyester melting above 140° C.

2. The interpolyester of claim 1 wherein the dicarboxylic acid is pinic acid and the glycol is ethylene glycol.

3. The interpolyester of claim 2 wherein the mixture of acids consists essentially of from 70 to 90 mol percent of terephthalic acid and from 30 to 10 mol percent of pinic acid, said interpolyester melting above 160° C.

4. The process of preparing filament and film forming linear interpolyesters melting above 140° C. which comprises reacting components consisting essentially of a mixture of 50 to 90 mol percent of a lower alkyl diester of terephthalic acid with from 50 to 10 mol percent of a lower alkyl diester of a dicarboxylic acid having the following general formula:

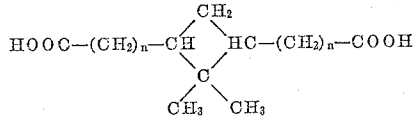

wherein $n$ is an integer of from 0 to 1, and at least 2 mols per mol of mixed acids of a glycol having the formula HO—R—OH wherein R is an alkylene radical having from 2 to 20 carbon atoms; reacting said components at a temperature above 150° C. in the presence of an ester interchange catalyst and in the absence of oxygen and moisture.

5. The process of claim 4 wherein the initial reaction temperature is kept from 150 to 225° C. until no further alcohol is liberated and thereafter the temperature is raised to from 200 to 400° C. with a gradual reduction of pressure to less than 5 mm. of mercury.

6. The process of claim 5 wherein the initial temperature ranges from 175° to 200° C., the temperature is raised to from 260° to 290° C., and the pressure is reduced to from 0.2 to 0.5 mm. of mercury.

References Cited in the file of this patent

UNITED STATES PATENTS

| | | |
|---|---|---|
| 2,180,418 | James | Nov. 21, 1939 |
| 2,623,033 | Snyder | Dec. 23, 1952 |
| 2,750,411 | Fisher et al. | June 12, 1956 |

OTHER REFERENCES

Murphy et al.: "Pinic Acid Diesters," Ind. and Eng. Chem., vol 45, No. 1, 1953, pp. 119–124.